United States Patent [19]

Bricker

[11] Patent Number: 4,583,432
[45] Date of Patent: Apr. 22, 1986

[54] SUPERCENTERING WORKPIECE HOLDER

[75] Inventor: Michael W. Bricker, Brodbecks, Pa.

[73] Assignee: AMP Incorporated, Harrisburg, Pa.

[21] Appl. No.: 667,244

[22] Filed: Nov. 1, 1984

[51] Int. Cl.⁴ .......................... B23B 1/00; B23B 3/36
[52] U.S. Cl. .................................. 82/1 C; 82/40 R; 82/45
[58] Field of Search ............ 82/45, 40 R, 33 R, 33 A, 82/1 C; 279/1 J, 5, 6

[56] References Cited

U.S. PATENT DOCUMENTS

| 80,928 | 8/1868 | Detrick | 279/6 |
|---|---|---|---|
| 1,817,721 | 8/1931 | Van Hamersveld | 279/6 |
| 2,276,945 | 3/1942 | Ehrich | 279/5 |
| 2,460,890 | 2/1949 | Lassy | 279/6 |
| 2,809,044 | 10/1957 | Landreth | 82/45 |
| 3,094,821 | 6/1963 | Eckert | 51/217 |
| 3,188,076 | 6/1965 | Pryor | 269/101 |
| 3,308,696 | 3/1967 | La Marca | 82/33 R |
| 3,323,809 | 6/1967 | Brookfield | 279/6 |
| 3,358,990 | 12/1967 | Anton | 269/118 |
| 3,756,102 | 9/1973 | Casey | 82/33 R |
| 3,887,202 | 6/1975 | Zapart | 279/5 |
| 4,151,984 | 5/1979 | Zapart | 269/9 |
| 4,445,678 | 5/1984 | George | 269/88 |

FOREIGN PATENT DOCUMENTS 443,476 12/1974 Belgium.
549,429 5/1974 Switzerland.

Primary Examiner—Leonidas Vlachos
Attorney, Agent, or Firm—Anton P. Ness

[57] ABSTRACT

Tooling holds a workpiece for the performance of a work step thereon or thereby, which supercenters the workpiece relative to a concentrically rotatable cylinder of an apparatus. A method of supercentering a workpiece utiliezs the tooling of the invention. The tooling has a workpiece clamping subassembly which is substantially centerable with respect to a centering member and then secured thereto forming a centering subassembly. The centering member has a centering projection which is supercenterable with respect to a holder by means of several axially normal adjustment screws engaging side surfaces of the centering projection. The holder has a cylindrical arm to be clamped in a collet chuck of the rotatable cylinder of the apparatus. The method utilizes slowly rotating the cylinder, thereby rotating the tooling and the clamped workpiece, and determining eccentricity of rotation thereof, and making appropriate incremental adjustments using the adjustment screws. Work steps may then be performed on or by the workpiece.

19 Claims, 13 Drawing Figures

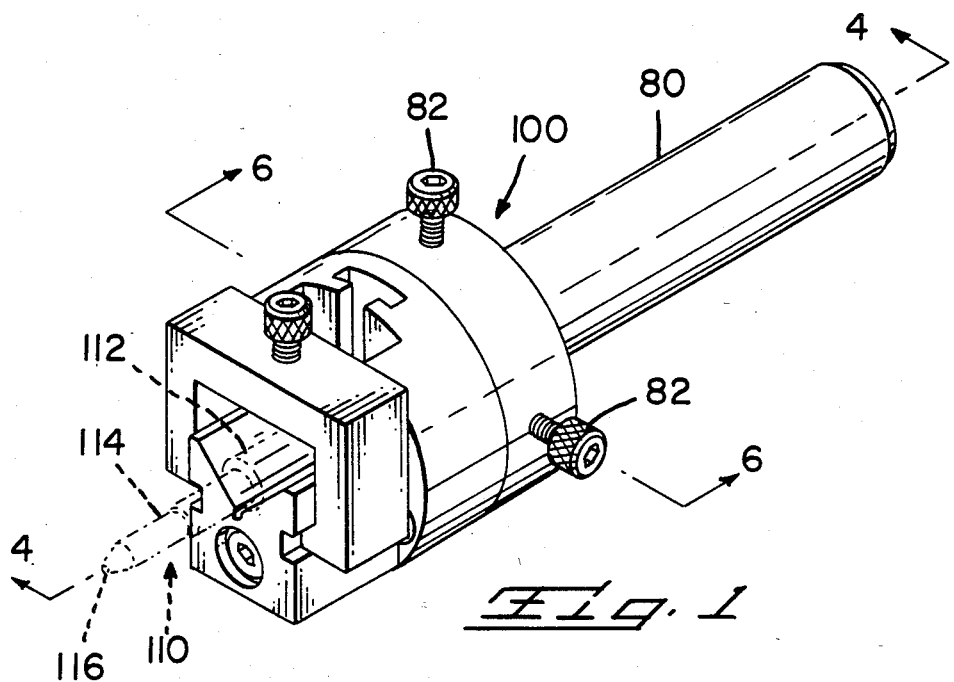
Fig. 1
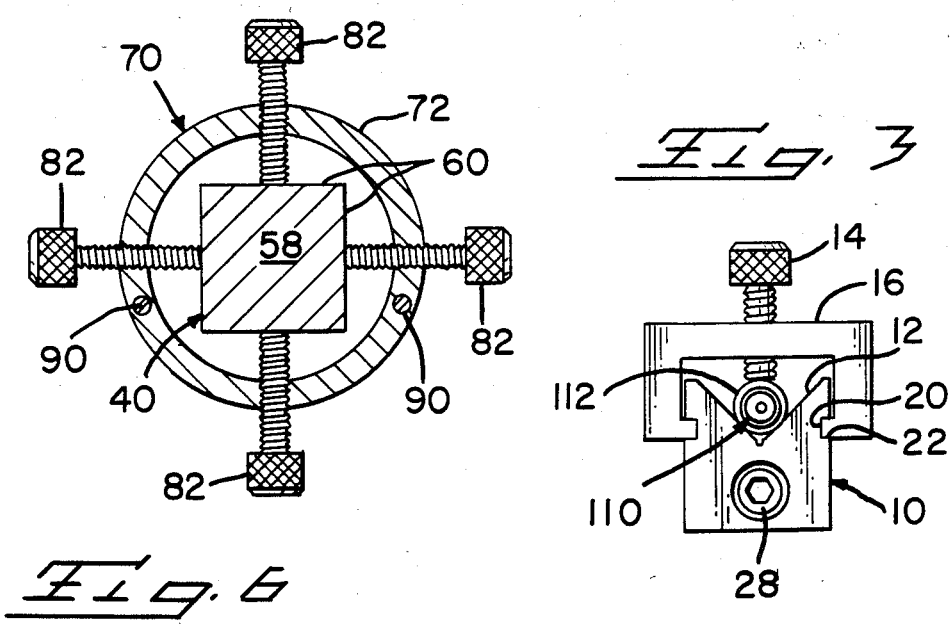
Fig. 6
Fig. 3

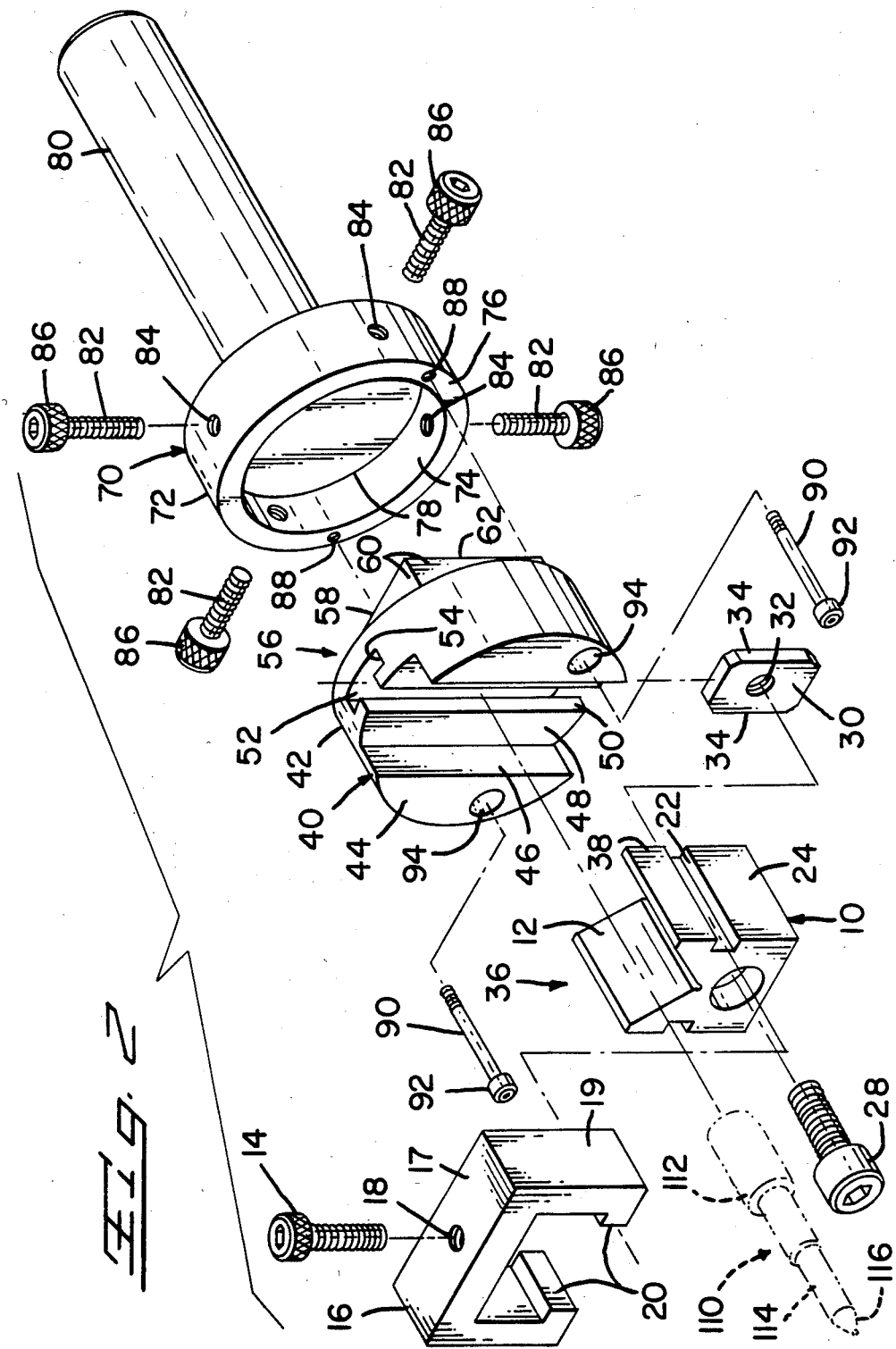

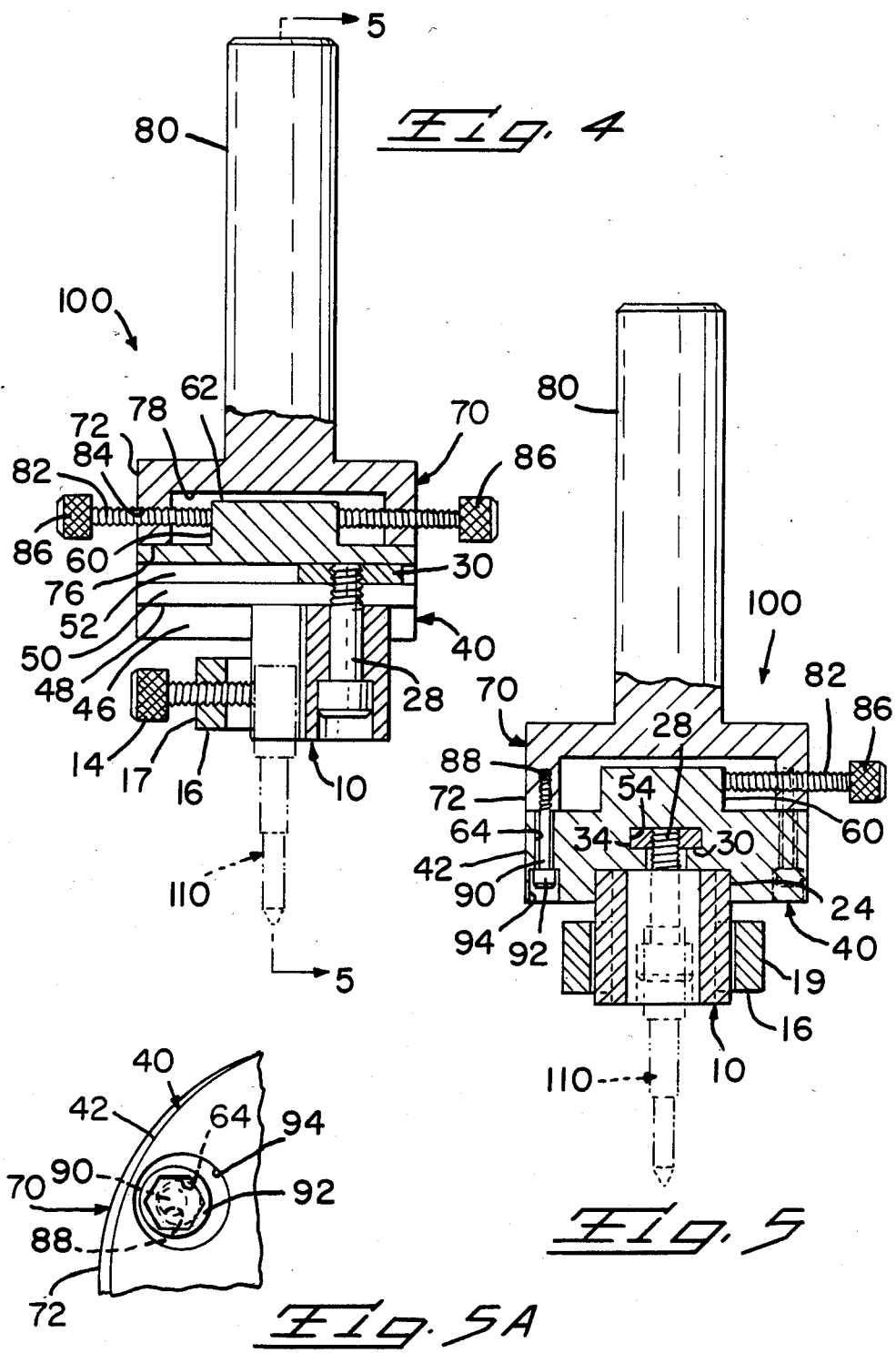

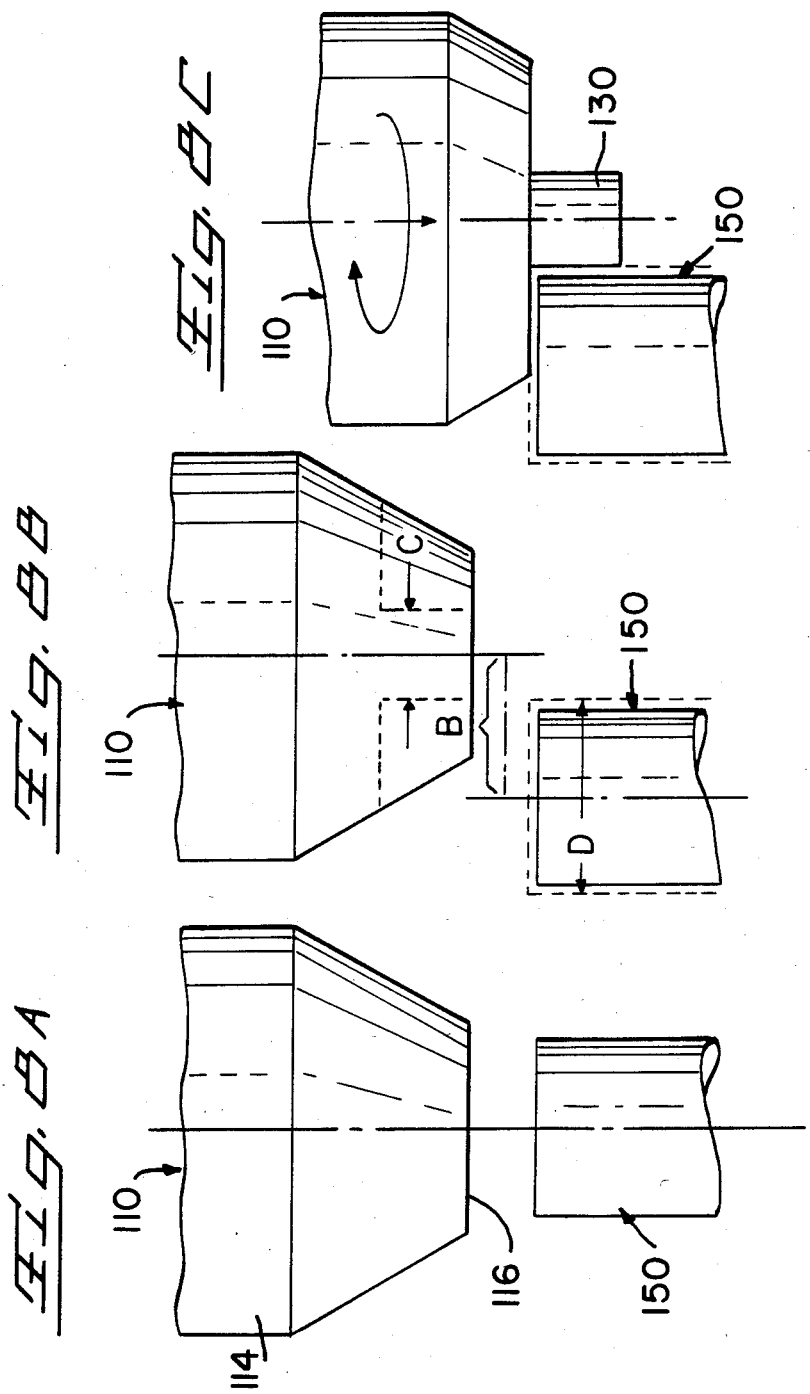

SUPERCENTERING WORKPIECE HOLDER

FIELD OF THE INVENTION

The present invention is related to the field of machine tooling for holding a workpiece, and more particularly, tooling for holding a workpiece requiring accurate centering.

BACKGROUND OF THE INVENTION

Apparatus is known which requires holding and rotating an article such as a workpiece for a work step to be performed on or by the article or workpiece. Examples of such apparatus are lathes, grinders, drills and electrical discharge boring machines. In many applications, precisely centered holding of the workpiece is critical, and certain electrical discharge machines currently offer centering to within 0.0003 inches accuracy.

Certain work operations require consistent accuracy much more precise than 0.0003 inches, such as boring a supercentered hole in the tip of a workpiece. Currently, such a workpiece may have a relatively large (such as 0.5 inches) diameter concentric cylindrical surface resulting from precision casting or milling or both, but requires a more precisely centered very small diameter bore than is presently achievable. It is desirable to be able to drill this supercentered bore to an extremely accurate, very small diameter centered on an axis with respect to the larger diameter cylindrical surface.

It may also be desirable to form on the tip of such a workpiece a supercentered very small diameter needle tip, centered on an axis with respect to the larger diameter concentric cylindrical surface as a reference surface. Both the boring of a hole and the creating of a needle can be performed with an electrical discharge machine, provided tooling can be provided which enables supercentering of the workpiece with respect to the electrode of the EDM. Usually the electrode of the EDM is clamped to a rotating upper cylinder, and the workpiece is affixed to a lower X-Y reference table positioned very accurately with respect to the electrode and adjustable to a very accurate degree in the horizontal plane before and during the electrical discharge operation. Tolerances for current EDM machines typically reach an accuracy of 0.0003 inches, but a need is seen for even much better accuracy.

SUMMARY OF THE INVENTION

A workpiece holding fixture is provided which is securable to a concentrically rotatable cylinder of an apparatus for a work step, which holding fixture is adjustable to an extremely accurate tolerance to center the axis of the workpiece with respect to the rotating cylinder. Such tolerance may be 0.00005 inches using the present invention with a workpiece having a precisely concentric cylindrical surface as a work portion. A workpiece clamping subassembly is provided comprising a V-block and clamping bracket and clamping screw which securely holds the clamping portion of the workpiece axially parallel in a V-groove, with the work portion of the workpiece extending forwardly therefrom, where the clamping portion has a surface parallel with the axis of the work portion. The rearward end of the clamping subassembly is first adjustably secured to a forward end of a centering member which has an axially normal channel enabling positioning of the clamping subassembly in one direction vertically with respect to the V-groove, and then tightly secured thereto forming a centering subassembly. The centering member has a centering projection extending rearwardly therefrom which has preferably four flat, axially parallel clamping surfaces and has a square block shape. A holder for the centering member is provided with preferably four finely threaded adjustment screws extending axially normally inwardly from threaded holes in sides of an annular forward clamping portion of the holder. The four adjustment screws are equally spaced about the circumference and are engageable with respective clamping surfaces of the centering projection, and the screws are adjustable from outside the holder such as by the operator. The holder has a rearwardly extending centered cylindrical arm to be clamped in appropriate tooling on the work end of the rotatable cylinder of the apparatus being used to perform the work step on the work portion of the workpiece, where the rotatable cylinder is capable of extremely accurate concentric rotation of the tooling.

To obtain supercentering using the assembly of the present invention, general centering of the workpiece is derived from its being disposed in the V-block in a "horizontal" direction with respect to the vee, and from the clamping subassembly being movable along the channel of the centering member in a "vertical" direction with respect to the vee. With the assembly held by tooling onto the rotating cylinder of the apparatus, supercentering is obtained by first determining the amount by which the work portion of the workpiece is off-center, and then using an appropriate combination of adjustments with the four adjustment screws to supercenter the centering projection within the holder the appropriate increment in the appropriate axially normal direction. Gages are known which are used to determine the amount and direction by which the work portion of the workpiece is off-center by very slowly rotating the cylinder of the apparatus to detect eccentricity. Readjustment can be made by repeating the procedure.

In general, the assembly of the present invention transfers the reference or clamping surface of the workpiece to the cylindrical holder arm held within the apparatus tooling, by use of the supercentering adjustment screws in cooperation with the centering projection.

BRIEF DESCRIPTION OF THE DRAWINGS

FIG. 1 is a perspective view of the assembly of the invention with a workpiece in phantom.

FIG. 2 is an exploded perspective view of the assembly of FIG. 1.

FIG. 3 is a frontal view of the clamping subassembly showing a workpiece secured therewithin.

FIG. 4 is a longitudinal section view of the assembly taken along line 4—4 of FIG. 1.

FIG. 5 is a longitudinal section view taken along line 5—5 of FIG. 4.

FIG. 5A is an enlarged diagrammatic view of the securing means between the holder and the centering subassembly.

FIG. 6 is a cross-sectional view of the assembly's adjustment area, taken along line 6—6 of FIG. 1.

FIGS. 8A, 8B and 8C are diagrams illustrating the "burning" of a needle tip on the end of a workpiece by an electrode.

DESCRIPTION OF THE PREFERRED EMBODIMENT

Figure 6A:
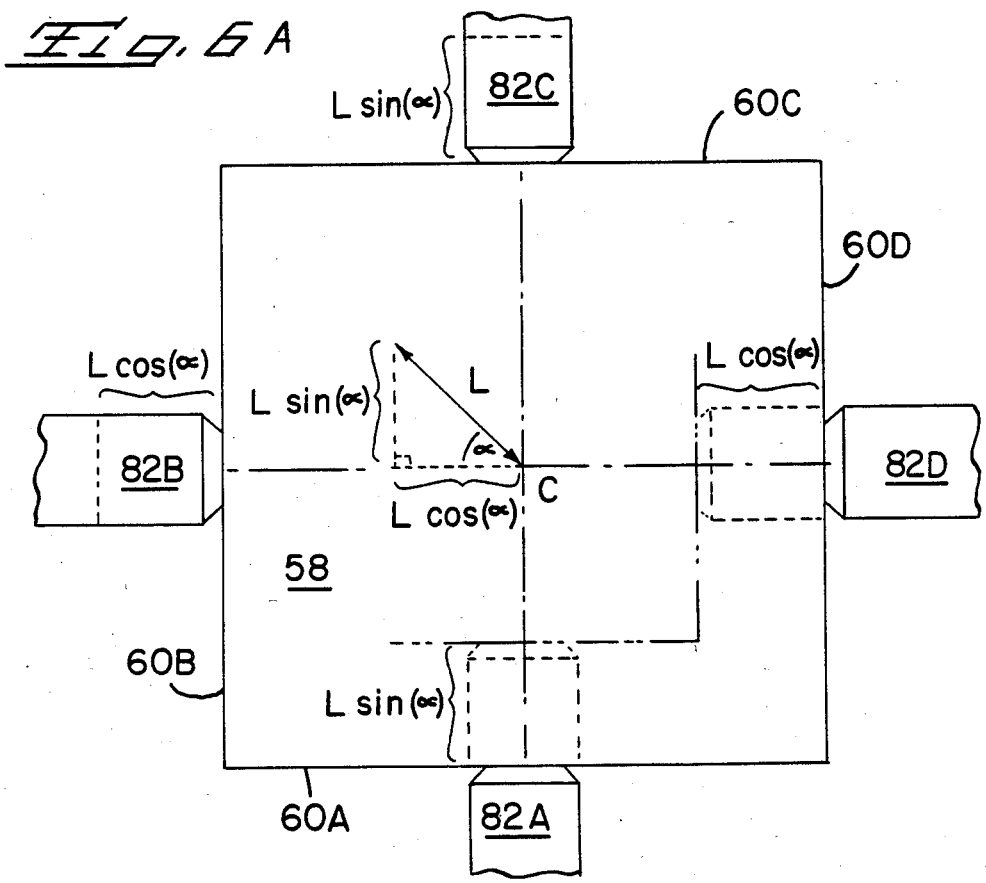
FIG. 6A is an enlarged diagrammatic view showing an adjustment being made in the adjustment area shown in FIG. 6.

Assembly 100 of the present invention is shown in FIG. 1, with a cylindrical article, workpiece 110 (in phantom) secured in a forward end thereof. With reference to FIG. 2, workpiece 110 (in phantom) is securable in a large longitudinal V-shaped groove 12 of a V-block 10 (comprising a first centering means) by a workpiece-clamping screw 14 of a clamping bracket 16. Clamping screw 14 extends axially normally inwardly through a threaded hole 18 of bracket 16 to engage reference surface 112 of workpiece 110 and secures the workpiece in groove 12, as shown in FIG. 3. Reference surface 112 should be a precision machined surface, preferably cylindrical, which is parallel to the axis of a concentric cylindrical work portion 114 of workpiece 110 which is used by the assembly 100 as a reference surface. With the vee shape of the groove where the apex of the vee is centered "horizontally" in V-block 10, disposed in a vertical longitudinal plane containing the longitudinal axis of V-block 10. Workpiece 110 is now aligned axially parallel with groove 12 and has a work portion 114 whereon (or whereby) work is to be performed extending forwardly from a front surface of V-block 10. The side surfaces forming the vee should be precision machined to be flat, smooth and axially parallel to V-block 10. Modified V-blocks and clamping brackets may be usable with workpieces having several axially parallel flat side surfaces as reference surfaces, such as those having a square cross-section where the modified vee shape has a 90° angle and two clamping screws extend from the bracket inwardly at 90° angles to engage two of the flat surfaces of the workpiece.

Clamping bracket 16 has a lateral top portion or bight 17, opposing parallel side portions 19 depending from the top portion, and inwardly extending longitudinal shoulders 20 which are inserted into corresponding longitudinal parallel channels 22 formed along parallel side surfaces 24 of V-block 10. Bracket 16 may be moved longitudinally along V-block 10 until a preferred position is obtained near the forward end of V-block 10.

V-block 10 has a large longitudinally extending threaded hole therethrough preferably with a recessed forward end in the forward surface of V-block 10 so that a securing screw 28 is disposed with its head preferably disposed in the recess. A flat, rectangular locking piece 30 has a threaded hole 32 therethrough centrally thereof, parallel long sides 34 a selected width apart, and preferably beveled corners. Locking piece 30 is loosely threadedly secured on the end of securing screw 28 so that it is substantially in an axially normal orientation. Clamping bracket 16 securely clamping workpiece 110 to V-block 10 results in a clamping subassembly 36 having a rearward end 38 (having an axially normal rearward surface) from which projects an end portion of securing screw 28 with locking piece 30 thereon. Parallel side surfaces 24 of V-block 10 have a selected width and form sides of rearward end 38.

A centering member 40 comprises a second centering means and preferably has a cylindrical portion 42 and flat axially normal forward surface 44. Extending from one side to the other in forward surface 44 is a large channel 46 having a flat axially normal bottom 48 and parallel sides normal thereto. Bottom 48 has a narrow central gap 50 therein in communication with an interior slot 52 wider than central gap 50 and extending from one side of member 40 to the other parallel with central gap 50. Large channel 46 is just wide enough for rearward end 38 of clamping subassembly 36 to fit therein; narrow gap 50 is just wide enough for a threaded portion of securing screw 38 to extend therethrough; and interior slot 52 is just wide enough and deep enough for locking piece 30 to be inserted from a side end of slot 52 and retained therein when oriented so that long sides 34 of locking piece 30 are disposed adjacent sides 54 of interior slot 52. Engagement of the axially normal rearward surface of rearward end 38 with axially normal forward surface 44 maintains a reference with reference surface 112 of workpiece 110.

Clamping subassembly 36 is secured to member 40 by sliding rearward end 38 thereof into large channel 46 from one end thereof, with locking piece 30 in a proper orientation entering an end of interior slot 52 and then an intermediate portion of securing screw 38 entering an end of narrow central gap 50. Clamping subassembly 36 is located along large channel 46 such that a center axis of workpiece 110 is substantially centered with respect to the outer surface of cylindrical portion 42 of member 40. A head portion of securing screw 38 is now turned such as by an Allen wrench, rotating in a tightening manner with respect to locking piece 30. Locking piece 30 is prevented from turning within slot 52 by sides 54 thereof; tightening is continued until clamping subassembly 36 is tightly secured to member 40 forming a centering subassembly 56.

Centering member 40 has a large centering projection 58 having a selected length extending rearwardly therefrom and axially centered therewith. Centering projection 58 preferably has a square block shape with flat axially parallel side surfaces 60 and an axially normal rear surface 62. Cylindrical portion 42 has preferably two oversized securing holes 64 extending longitudinally therethrough proximate the outer surface thereof on two opposing sides of centering projection 58 whose locations are selected not be centered with respect to any of the side surfaces of centering projection 58.

Holder 70 has a cylindrical sleeve-like forward adjustment portion 72 having a wide cylindrical recess 74 extending thereinto from a forward end thereof forming an annular forward surface 76 in a plane axially normal to holder 70. Recess 74 has a bottom surface 78 which also is axially normal, and a depth greater than the length of projection 58. A rearwardly projecting clamping projection, concentric right-cylindrical arm 80 is axially centered with respect to holder 70 and will be clamped by a collet chuck or other tooling of an apparatus with which the present invention may be used.

Adjustment screws 82 extend through associated threaded holes 84 in sides of sleeve-like forward portion 72 of holder 70. There are preferably four adjustment screws, with holes 84 preferably spaced 90° from each other about the circumference in an axially normal plane, so that adjustment screws 82 are disposed therein in an axially normal orientation. Adjustment screws are preferably finely threaded and have knurled wide or very wide head portions 86 for manual or tool-assisted rotation. It is foreseeable that the adjustment screws may be made with features for automated adjustment. Also, other means may be used capable of incremental movement thereof and capable of retaining the selected position.

Sleeve-like portion 72 of holder 70 has threaded holes 88 through annular forward surface 76 associated and aligned with securing holes 64 of centering member 40. Shoulder screws 90 are associated with holes 64 and 88 and have wide heads 92 which will be disposed in wide recesses 94 around holes 64 in the forward surface 44 of cylindrical portion 42 of centering member 40, preferably one on each side of large channel 46. Securing holes 64 are substantially wider than the shanks of shoulder screws 90; heads 92 of shoulder screws 90 are wider than holes 64; and wide recesses 94 have a diameter wider than heads 92, all as best seen in FIG. 5. Centering member 40 may be secured to holder 70 by shoulder screws 90 in such a manner as to disallow axial movement therebetween but not to be so tightly held that axially normal adjustment of centering member 40 with respect to holder 70 cannot be manually made. By reason of the wide diameter of holes 64, shoulder screws 90 may "float" therein laterally to some extent without permitting axial movement of centering member 40 with respect to holder 70, as represented in the diagram of FIG. 5A. In FIG. 5A, centering member 40 is viewed from forward thereof in the vicinity of one of the oversized securing holes 64 showing recess 94, hole 64 and cylindrical surface 42, and securing screw 90 with head 92, and the side surface of forward portion 72 of holder 70 rearward thereof; securing screw 90 is off of center with respect to oversized securing hole 64 and recess 94, and centering member 40 is laterally displaced with respect to holder 70. (Shoulder screws 90 may be tightened further after the supercentering adjustment is made as described below.)

A rear surface of cylindrical portion 42 of centering member 40 is axially normal and engages axially normal annular forward surface 76 of holder 70 when assembled thereto by shoulder screws 90 which continues the reference with reference surface 112 of workpiece 110. (Right cylindrical clamping arm 80 extends the reference to the concentric tooling on the work end of the rotatable cylinder of the apparatus.) Centering projection 58 is disposed in wide cylindrical recess 74 spaced from bottom surface 78 thereof with side surface 60 facing associated threaded holes 84 in sleeve-like forward portion 72 of holder 70 such that holes 84 are centered with respect to associated side surfaces 60. Adjustment screws 82 extend inwardly through threaded holes 84 and engage side surfaces 60 centrally thereof, as seen in FIG. 6.

Centering projection 58 and corresponding centering subassembly 56 and hence workpiece 110 can be moved in incremental amounts in an axially normal plane by appropriate incremental rotation of selected adjustment screws 82 in an appropriate sequential combination. With reference to the diagram of FIG. 6A, if it is desired to move center point C of centering projection 58 in an upward left direction at an angle ($\alpha$) to the "horizontal" a distance L (exaggerated for purposes of explanation), this is accomplished by rotating adjustment screws 82A, 82B, 82C and 82D in the following manner: Screw 82B is slightly loosened; screw 82C is rotated so as to move outwardly a distance equal to $L \times \text{sine}(\alpha)$; screw 82A is rotated to move inwardly a distance equal to $L \times \text{sine}(\alpha)$ and remain slightly loosened; screw 82B is rotated to move outwardly a total distance equal to $L \times \text{cosine}(\alpha)$; screw 82D is rotated to move inwardly a distance equal to $L \times \text{cosine}(\alpha)$; and screw 82A is tightened.

Distance L is an incremental distance, the limits of which are determined by the manner of securing the centering member 40 to holder 70. The upper limit in the present embodiment of the invention is less than the difference between the diameter of wide holes 88 in holder 70 and the diameter of shank portions of associated shoulder screws 90 (and usually less than one-half that difference) which is the total axially normal distance which member 40 is able to "float" with respect to holder 70. Other manners of securing the cylinder to the holder may permit greater upper limits on distance L. However, if greater centering adjustment of the workpiece is needed, this should be only needed in the "vertical" direction with respect to V-groove 12, referring to FIG. 3. Such greater adjustment may be accomplished by loosening securing screw 28 and adjusting the position of clamping subassembly 36 along large channel 46 of centering member 40, and tightening securing screw 28. If wide holes 88 were provided with a "horizontal" oblong shape, then greater "horizontal" incremental movement of centering projection 58 could be permitted.

The various parts of the assembly of the present invention are preferably precision machined of oil-hardened steel, and the screws are preferably of heat-treated alloy steel and have knurled heads with hexagonal recesses for either manual or tool-assisted rotation. It may be seen that adjustment screws 82 may be provided with very wide heads for even more precise manual adjustment.

Once assembled as shown in FIG. 1, assembly 100 with workpiece 110 secured in its forwrd end is ready for supercentering adjustment of the work portion 114. Cylindrical arm 80 is gripped in a collet chuck or other appropriate tooling on the rotating cylinder of the apparatus (not shown). For purposes of this example, the apparatus is an electrical discharge machine (EDM) such as that commercially available from System 3R International AB of Vallingby, Sweden or from Eltee Pulsitron of West Caldwell, N.J. The work step is the "burning" of a very small axial bore into the forward end 116 of the work portion 114 of workpiece 110.

Assembly 100 was supercentered in an EDM by very slowly rotating the apparatus cylinder and detecting eccentricity of work portion 114 by use of a gage. The gage used was a BESTEST indicator (trademark) sold by Brown & Sharpe Mfg. Co. of North Kingstown, R.I. (EDP No. 45981) with a dial having a smallest indicating division or graduation of 0.00005 inches, a repetition accuracy of 0.00002 inches, and a calibration accuracy of 0.0001 inches. With the contact of the gage applied against work portion 114, the maximum deviation from concentricity was measured and rotation was stopped at the angle at which the point of maximum deviation occurred. Adjustments were made using adjustment screws 82 in the manner described above to move centering subassembly 56 the distance equaling one-half the maximum deviation in the appropriate direction, to achieve concentric positioning of work portion 114. Very slow rotation was renewed and gage measurements again taken and readjustments made accordingly, repeating the steps described until concentricity was obtained which occurred when no measurable reading was observed on the gage.

Figure 7A:
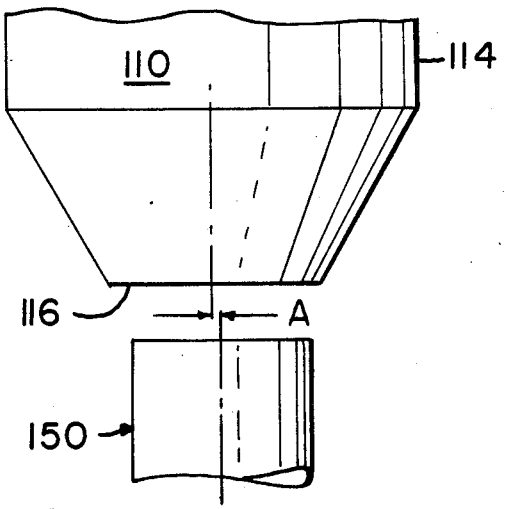
FIGS. 7A and 7B are diagrams illustrating the "burning" of a bore in a forward tip of a workpiece by an electrode.
Figure 7B:
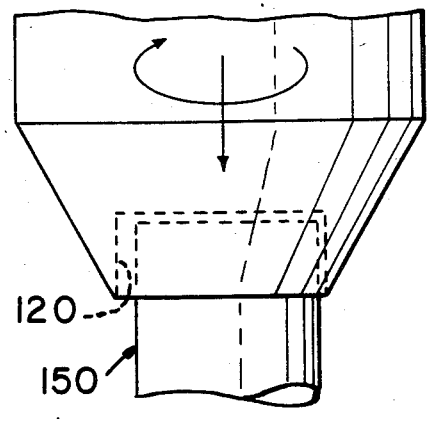

Referring to FIGS. 7A and 7B, an electrode 150 was selected having a diameter of 0.038 inches and an effective "burning" diameter of 0.0385 inches. Electrode 150 was secured in a centered position on the lower X-Y table holding fixture (not shown). The "burning" technique used was to center the electrode in the X-Y plane 0.00095 inches off of center from the centerline of supercentered forward end 116 of workpiece 110 (incremental distance A of FIG. 7A), and to rotate the workpiece while slowly lowering it to the electrode 150, effecting a relative slight eccentric movement of electrode 150 with respect to forward end 116. A "burned" bore was obtained having a diameter of 0.0404 inches and a depth of 0.500 inches, and the bore was supercentered with respect to work portion 114 of workpiece 110.

It is also possible to "burn" a bore in forward end 116 which is located a precise incremental distance off of center with respect to the axis of work portion 114, by using the gage to first supercenter the work portion with respect to both the rotatable cylinder and the electrode, and then move the axis (using adjustment screws 82) precisely the desired incremental distance off of center, by again using the gage, and also centering the electrode an amount off of center equivalent to increment A in FIG. 7A to allow for the electrode to "move" slightly within the bore as it "rotates" and "burns". Then by rotating the rotatable cylinder, the work portion 114 will be rotated eccentrically, and when lowered onto the electrode a bore will be "burned" which is the prescribed distance from the axis of work portion 114.

Using the same arrangement and technique as described to supercenter the work portion 114 of a workpiece 110, but with a relatively much greater distance off of center (incremental distance B of FIG. 8B), a "needle" tip 130 could be formed by "burning" surrounding material of forward end 116 using electrode 150 to leave tip 130 remaining, as shown in the diagrams of FIGS. 8A, 8B and 8C. Incremental distance B would be equal to the sum of the desired radius of the "needle" tip 130 (one-half of diameter C) and one-half of the effective "burning" diameter D of the electrode 150. While the surface of the "needle" tip 130 it is believed would be rough, pitted and uneven, a controlled plating procedure known in the art could be used to provide a workable, smooth, even surface on the needle tip.

Other operations may be performed with other apparatus which may take advantage of the supercentering workpiece holder of the present invention, such as precision lathe cutting or milling to form a smaller diameter concentric cylindrical portion of a workpiece forward of a larger diameter concentric portion (whether coaxial therewith or axially parallel but eccentrically spaced), or holding an electrode which must be rotated during operation to perform a task, or even a precision drill bit for very low torque drilling. Even for operations having torque applied to an article held therein, accessory apparatus can be foreseeable which applies torque directly to the article such as a precision drill bit after the bit has been supercentered with the assembly of the present invention without necessarily removing the bit from the assembly, so long as the clamping means of the accessory apparatus precisely locates itself with respect to the bit and conforms its position firmly thereat in order to apply torque. Many other uses will occur to those skilled in the art.

Variations may occur in the structure of the assembly of the present invention without departing from the spirit of the invention nor the scope of the claims. In particular, variations may be developed in the clamping of a workpiece in the assembly, or the securing of the parts of the assembly together, or the nature of the adjustment screws, or even in automating the adjustment of the adjustment screws rather than by manual adjustment, to be responsive to gages which may be used to control the adjustment. The essential result of the present invention is that centering of an article such as a workpiece can be consistently obtained to a greater extent than is known in the art.

What is claimed is:

1. A tooling assembly for securing an article to a concentrically rotatable cylinder of a work apparatus for the performance of a work step associated with said article and centering a concentric cylindrical work portion of said article with respect to said rotatable cylinder, said work portion defining a longitudinal central axis of said article, said article having a peripheral longitudinal reference surface parallel to said central axis, and at least a portion of said reference surface being remote from said work portion, said assembly comprising:

a centering subassembly means securing at a forward end thereof said portion of said reference surface of said article remote from said work portion and said subassembly means being axially referenced with said reference surface of said article, said work portion of said article extending forwardly from said forward end of said subassembly means, said centering subassembly means of having a centering projection means at a rearward end thereof having a central axis axially referenced to said reference surface of said article and having a plurality of outwardly facing flat adjustment surface portions which are disposed in respective planes about said central axis which planes are parallel to said central axis;

an adjustable holding means to which said centering subassembly means is securable at a forward end thereof in an axially referenced relationship, said holding means having an adjustment portion, a plurality of adjustment means circumferentially disposed about said adjustment portion, and a rearwardly extending clamping projection coaxial with a central longitudinal axis of said adjustable holding means for being grippingly secured by a cooperating holding means at a work end of said rotatable cylinder of said apparatus, wherein said adjustment portion is circumferentially disposable about said centering projection means of said centering subassembly means, each of said adjustment means extends inwardly through an associated cooperating hole means of said adjustment portion to engage a respective adjustment surface portion of said centering projection means, said plurality of adjustment means capable of cooperating to firmly secure said centering projection means against axially normal motion, each of said adjustment means having an operator-accessible head portion to enable incremental adjusting movement along said inward direction;

and a securing means securing said centering subassembly means to said adjustable holding means against axially parallel movement and permitting axially normal movement of said centering subassembly means with respect to said adjustable holding means.

2. A tooling assembly as set forth in claim 1 wherein each said adjustment means is a threaded screw and each said cooperating hole means is cooperatingly threaded.

3. A tooling assembly as set forth in claim 1 wherein said adjustment portion has a sleeve-like shape having an annular axially normal forward surface engageable with a corresponding axially normal rearward surface of a body portion of said centering subassembly remote from said centering projection means.

4. A tooling assembly as set forth in claim 1 wherein said centering projection means has four outwardly facing flat adjustment surface portions defining side portions of a rectangle, and said adjustable holding means has four adjustment means corresponding therewith.

5. A tooling assembly as set forth in claim 1 wherein said rearwardly extending clamping projection is a cylindrical arm.

6. A tooling assembly as set forth in claim 1 wherein said securing means comprises at least two shoulder screws extending rearwardly from a forward surface of a body portion of said centering subassembly through associated holes and threadingly engaging corresponding threaded holes in a forward surface of said adjustment portion of said adjustable holding means, each said associated hole having a preselected diameter larger than the diameter of a shank portion of a said shoulder screw disposed therein, and each said shoulder screw having a head portion wider than said preselected hole diameter, said shoulder screws, said associated hols and said corresponding threaded holes being disposed radially remote from said centering projection and angularly remote from said adjustment means.

7. A tooling assembly as set forth in claim 1 wherein said securing means comprises at least two shoulder screws extending forwardly from a rear surface of said adjustment portion of said adjustment means through associated holes and threadingly engaging corresponding threaded holes in a rearward surface of a body portion of said centering subassembly, each said associated hole having a preselected diameter larger than the diameter of a shank portion of a said shoulder screw disposed therein, and each said shoulder screw having a head portion wider than said preselected hole diameter, said shoulder screws, said associated holes and said corresponding threaded holes being disposed radially remote from said centering projection and angularly remote from said adjustment means.

8. A tooling assembly as set forth in claim 1 wherein said centering subassembly includes:
an article-clamping means securing said portion of said reference surface of said article remote from said work portion, said clamping means being axially referenced with said reference surface of said article;
a first centering means associated with and axially referenced to said article-clamping means for centering said axis of said article in a first axially normal direction; and
a second centering means associated with and axially referenced to said article-clamping means for centering said axis of said article in a second axially normal direction substantially perpendicular to said first direction.

9. A tooling assembly as set forth in claim 8 wherein said article-clamping means secures said reference surface of said article to said first centering means such that said central axis of said article is disposed in a central longitudinal plane of said first centering means.

10. A tooling assembly as set forth in claim 9 wherein said first centering means has opposing parallel side surfaces, an axially normal rear surface and a large V-shaped groove extending inward from a top surface centrally between said side surfaces.

11. A tooling assembly as set forth in claim 10 wherein said article-clamping means is a bracket having a lateral top portion, opposing parallel side portions depending normally from sides of said top portion and having inwardly extending shoulder portions normal to said side portions, and an adjustable clamping screw extending inwardly through a corresponding hole in said top portion centrally thereof, and said first centering means has longitudinal channels in said side walls within which said shoulder portions of said bracket are to be disposed and along which said shoulder portions are longitudinally positionable in an axially parallel direction.

12. A tooling assembly as set forth in claim 8 wherein said second centering means has a large radial groove extending across an axially normal forward surface and having an axially normal bottom surface along which an axially normal rearward end of said first centering means is slidably securable, and there being a subassembly securing means for releasably securing said first centering means and said second centering means.

13. A tooling assembly as set forth in claim 12 wherein said subassembly securing means includes a screw means extending axially parallel rearwardly from said first centering means through a central gap of said bottom surface of said large radial groove of said second centering means and threadedly engages a cooperating locking means therepast in a manner permitting a loosened position such that said rearward end of said first centering means may be moved laterally along said radial groove and said screw means along said central gap.

14. A tooling assembly as set forth in claim 13 wherein said second centering means includes an axially normal slot parallel with said large radial groove and in communication with said central gap thereof and having a preselected width, and said cooperating locking means comprises a flat rectangular locking piece having a threaded hole centrally thereof for threaded engagement with said screw means, and having parallel long sides and a width just less than said preselected width of said slot such that said locking piece when properly oriented is slidable laterally along said slot when disposed therein and in engagement with said screw means in said loosened position, and being secured against rotation by sidewalls of said slot when said screw means is rotated.

15. A tooling assembly as set forth in claim 12 wherein said centering projection means extends rearwardly from a rearward end of said second centering means.

16. A method of centering an article relative to a concentrically rotatable cylinder, said article having a concentric cylindrical work portion defining a longitudinal axis and a peripheral axially parallel reference surface, at least a portion of said reference surface being remote from said work portion, comprising the steps of:
securing said remote portion of said reference surface of said article in a forward end of a tooling assembly having a forward centering subassembly and a rearward adjustable holding means such that said work portion extends axially forwardly from said forward end, said adjustable holding means having a rearwardly extending clamping projection coaxial with a central longitudinal axis of said holding means for being grippingly secured by a cooperating holding means of said rotatable cylinder, said adjustable holding means also including an adjustment portion at a forward end thereof circumferentially disposed around a center projection means extending axially parallel rearwardly from said centering subassembly, said adjustment portion having a plurality of inwardly extending adjustment means in engagement with associated adjustment surface portions of said centering projection means, which adjustment means have operator-accessible head portions to enable incremental adjusting movement;

securing said clamping projection centrally within said rotatable cylinder;

slowly rotating said rotatable cylinder;

determining the maximum deviation from concentricity of a side surface of said work portion of said article;

adjusting a selected combination of said adjustment means to engage said associated surface portions of said centering projection means to move said centering projection means in an appropriate axially normal direction an incremental amount equal to one-half of said determined maximum deviation, whereby said work portion of said article is correspondingly moved into at least substantial concentricity with said rotatable cylinder.

17. A method as set forth in claim 16 whereby following said adjusting step, the maximum deviation from concentricity is again determined, and adjusting is again made of a selected combination of said adjustment means.

18. A method as set forth in claim 16 wherein said article is secured by a clamping means to a first centering means of said centering subassembly such that said central axis of said article is disposed in a plane containing a longitudinal central axis of said first centering means.

19. A method as set forth in claim 18 wherein said first centering means is releasably securable to a forward end of a second centering means having a longitudinal central axis parallel to said axis of said first centering means, and is laterally movable a selected distance with respect thereto in a fixed axially normal direction substantially parallel to said plane containing said central axis of said first centering means and said central axis of said article, and then is lockingly securable to said second centering means.

* * * * *